(12) United States Patent
Shi et al.

(10) Patent No.: US 11,835,422 B2
(45) Date of Patent: Dec. 5, 2023

(54) VEHICLE BODY CONTOUR-BASED DERAILMENT DETECTION METHOD FOR RAIL VEHICLE

(71) Applicant: CRRC Nanjing Puzhen Co., Ltd., Nanjing (CN)

(72) Inventors: Meng Shi, Nanjing (CN); Qi Gao, Nanjing (CN); Ye Lin, Nanjing (CN); Rui Shi, Nanjing (CN); Lei Xia, Nanjing (CN); Xiaofang Shi, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 725 days.

(21) Appl. No.: 17/044,269

(22) PCT Filed: Dec. 5, 2019

(86) PCT No.: PCT/CN2019/123205
§ 371 (c)(1),
(2) Date: Sep. 30, 2020

(87) PCT Pub. No.: WO2021/103087
PCT Pub. Date: Jun. 3, 2021

(65) Prior Publication Data
US 2023/0258536 A1   Aug. 17, 2023

(30) Foreign Application Priority Data
Nov. 29, 2019   (CN) .......................... 201911200900.X

(51) Int. Cl.
*G01M 17/08*   (2006.01)
*B61F 9/00*   (2006.01)
*G01S 17/931*   (2020.01)
*B61L 15/00*   (2006.01)

(52) U.S. Cl.
CPC ......... *G01M 17/08* (2013.01); *B61L 15/0081* (2013.01); *G01S 17/931* (2020.01); *B61F 9/005* (2013.01)

(58) Field of Classification Search
CPC ...... G01S 17/931; G01M 17/08; B61L 3/008; B61L 15/0081; B61K 13/00; B61F 9/005
See application file for complete search history.

(56) References Cited

U.S. PATENT DOCUMENTS

9,296,401 B1 * 3/2016 Palmer .................. B61L 25/025
2019/0232978 A1 * 8/2019 Im ........................... B61C 17/00

FOREIGN PATENT DOCUMENTS

| CN | 101666716 A | 3/2010 | |
| CN | 103223955 A | 7/2013 | |
| CN | 104048646 A | 9/2014 | |
| CN | 104527722 A | 4/2015 | |
| CN | 108860205 A | 11/2018 | |
| CN | 109532937 A | 3/2019 | |
| CN | 110030950 A | 7/2019 | |
| DE | 102015119392 A1 | 5/2017 | |
| EP | 2378263 A1 * | 10/2011 | ............ G01M 1/122 |
| JP | 5885895 B1 | 3/2016 | |
| WO | WO-2020089035 A1 * | 5/2020 | .............. B61F 9/005 |

* cited by examiner

*Primary Examiner* — Jennifer Bahls
(74) *Attorney, Agent, or Firm* — Bayramoglu Law Offices LLC

(57) ABSTRACT

A vehicle body contour-based derailment detection method for a rail vehicle, including: measuring distances between measuring points and rails through a range finder mounted on an underframe of a vehicle body, and calculating a transverse displacement of the current vehicle body in a vehicle body coordinate system; measuring an inclination angle of the current vehicle body in the vehicle body coordinate system through an inclination sensor on the vehicle body; with reference to a size of the vehicle body and distribution positions of the measuring points, as well as the transverse displacement of the current vehicle body in the vehicle body coordinate system and the inclination angle of the vehicle body in the vehicle body coordinate system, obtaining a dynamic outer contour of the vehicle body in the vehicle body coordinate system and converting it into a dynamic outer contour in the rail coordinate system.

8 Claims, No Drawings

VEHICLE BODY CONTOUR-BASED DERAILMENT DETECTION METHOD FOR RAIL VEHICLE

CROSS REFERENCE TO RELATED APPLICATION

This application is the national stage entry of International Application No. PCT/CN2019/123205, filed on Dec. 5, 2019, which is based upon and claims priority to Chinese Patent Application No. 201911200900.X, filed on Nov. 29, 2019, the entire contents of which are incorporated herein by reference.

TECHNICAL FIELD

The present invention relates to a vehicle body contour-based derailment detection method for a rail vehicle.

BACKGROUND

With the continuous acceleration of the urbanization process in China, advantages of rail transit in the urban transportation system gradually become prominent. Urban rail transit is playing an increasingly important role in public transportation in China due to its advantages including a strong transportation capacity, short intervals, environmental friendliness, and pollution-free. As the volume of passenger traffic rises sharply, requirements for the traveling safety of urban rail transit are also increasingly high. For problems about how to ensure that a train maintains a good technical condition during a long journey and whether a travel performance problem of a vehicle can be found in time, resolving the problems before a derailment accident occurs is an important task confronted by technicians. Theoretical researches and emergency measures related to train derailment in China and abroad approximately include the following solutions:
1) forecasting vehicle derailment by analyzing traveling-status parameters of a locomotive;
2) installing a ground safety monitoring system for a vehicle traveling status; and
3) a ground-mounted automatic alarm apparatus for train derailment.

It is found through searches that Chinese invention patent application CN108860205A discloses a derailment detection method and apparatus for a rail vehicle, where a transition cross beam spanning a bogie frame is disposed in the middle of the bogie frame, and a pressure sensor is disposed at a position on the transition cross beam corresponding to a wheel; when a vehicle derails, a pressure sensitive element of the pressure sensor comes into contact with a rail, detects a pressure change, and issues an alarm signal; and an output cable of a signal processing unit of the pressure sensor transmits the alarm signal to a train control system to give a derailment alarm.

SUMMARY

For the foregoing problems in the prior art, an objective of the present invention is mainly to provide a vehicle body contour-based derailment detection method for a rail vehicle.

To resolve the foregoing technical problems, the present invention provides a vehicle body contour-based derailment detection method for a rail vehicle, including the following steps:

step 1: establishing a vehicle body coordinate system and a rail coordinate system in a stationary state, where the vehicle body coordinate system takes a projection of a center point of a length between bogie pivot centers on a floor face of a vehicle body as an origin, a length direction of the vehicle body as an X axis, a transverse centerline of the vehicle body as a Y axis, and a vertical centerline of the vehicle body as a Z axis; and the rail coordinate system takes an intersection between a rail cross-section in which the origin of the vehicle body coordinate system is located and a rail centerline as an origin, a rail extension direction as an X axis, a transverse connecting line of a rail plane as a Y axis, and a vertical centerline of the rail plane as a Z axis;

step 2: obtaining coordinates of the origin of the vehicle body coordinate system in the rail coordinate system and an included angle between the Z axes of the two coordinate systems from original data of the vehicle body and rails in the stationary state, to determine a relationship between the vehicle body coordinate system and the rail coordinate system;

step 3: measuring distances between measuring points and the rails by using range finders mounted on an underframe of the vehicle body, and calculating a transverse displacement of the current vehicle body in the vehicle body coordinate system with reference to distances between the measuring points and the rails in the stationary state; and measuring an inclination angle of the current vehicle body in the vehicle body coordinate system by using an inclination sensor on the vehicle body;

step 4: obtaining a dynamic outer contour of the vehicle body in the vehicle body coordinate system with reference to a size of the vehicle body, distribution positions of the measuring points, as well as the transverse displacement of the current vehicle body in the vehicle body coordinate system and the inclination of the vehicle body in the vehicle body coordinate system;

step 5: converting the dynamic outer contour of the vehicle body in the vehicle body coordinate system into the rail coordinate system with reference to the relationship between the vehicle body coordinate system and the rail coordinate system, to obtain a dynamic outer contour of the vehicle body in the rail coordinate system; and step 6: dynamically comparing the dynamic outer contour of the vehicle body in the rail coordinate system with a vehicle travel determining envelope, and detecting an accidental derailment phenomenon in a traveling process of the vehicle, where the vehicle travel determining envelope is a buffer with a radius R made on the basis of a maximum vehicle travel envelope required by a standard.

The derailment detection solution of the present invention is: disposing a range finder and an inclination sensor on a vehicle body to measure a transverse displacement applied to the vehicle body and an inclination in real time, monitoring in real time a dynamic outer contour of the vehicle body from which an traveling status of the vehicle is converted, and at the same time, and comparing in real time the dynamic outer contour of the vehicle with a determining envelope formulated with a boundary of the vehicle as a basis, to determine whether derailment occurs, where when a derailment signal is detected, a system gives an alarm in time and applies a vehicle control action.

DETAILED DESCRIPTION OF THE EMBODIMENTS

Implementations of the present invention are explained and descried below.

Two range finders are amounted on an underframe of a vehicle body to measure distances between measuring points and rails. The range finder is a two-dimensional laser sensor and includes two sensors, where then a vehicle is in a stationary state, the two sensors are distributed on two sides above the rail. At least two range finders are mounted on an underframe of each carriage, the two range finders are distributed on two sections of the vehicle, which are suggested to be a middle section and a rear section of the vehicle. In addition, an inclination sensor is disposed on the vehicle body, to measure an inclination angle of the vehicle body, and there is no special requirement on a position for disposing the inclination sensor provided that the inclination sensor is on the vehicle body.

This embodiment provides a vehicle body contour-based derailment detection method for a rail vehicle, including the following steps:

Step 1: Establish a vehicle body coordinate system and a rail coordinate system in a stationary state, where the vehicle body coordinate system takes a projection of a center point of a length between bogie pivot centers on a floor face of a vehicle body as an origin, a length direction of the vehicle body as an X axis, a transverse centerline of the vehicle body as a Y axis, and a vertical centerline of the vehicle body as a Z axis; and the rail coordinate system takes an intersection between a rail cross-section in which the origin of the vehicle body coordinate system is located and a rail centerline as an origin, a rail extension direction as an X axis, a transverse connecting line of a rail plane as a Y axis, and a vertical centerline of the rail plane as a Z axis.

Step 2: Obtain coordinates of the origin of the vehicle body coordinate system in the rail coordinate system and an included angle between the Z axes of the two coordinate systems from original data of the vehicle body and rails in the stationary state, to determine a relationship between the vehicle body coordinate system and the rail coordinate system.

Step 3: Measure distances between measuring points and the rails by using range finders mounted on an underframe of the vehicle body, and calculate a transverse displacement of the current vehicle body in the vehicle body coordinate system with reference to distances between the measuring points and the rails in the stationary state; and measure an inclination angle of the current vehicle body in the vehicle body coordinate system by using an inclination sensor on the vehicle body. Because measurement is performed in real time, to eliminate interference, in this embodiment, transverse displacement data of the current vehicle body in the vehicle body coordinate system and inclination data of the current vehicle body in the vehicle body coordinate system are filtered to remove interference data.

Step 4: Obtain a dynamic outer contour of the vehicle body in the vehicle body coordinate system with reference to a size of the vehicle body, distribution positions of the measuring points, as well as the transverse displacement of the current vehicle body in the vehicle body coordinate system and the inclination of the vehicle body in the vehicle body coordinate system.

Step 5: Convert the dynamic outer contour of the vehicle body in the vehicle body coordinate system into the rail coordinate system with reference to the relationship between the vehicle body coordinate system and the rail coordinate system, to obtain a dynamic outer contour of the vehicle body in the rail coordinate system.

Step 6: Dynamically compare the dynamic outer contour of the vehicle body in the rail coordinate system with a vehicle travel determining envelope, and detect an accidental derailment phenomenon in a traveling process of the vehicle, and if the dynamic outer contour of the vehicle body in the rail coordinate system exceeds the vehicle travel determining envelope, determine that derailment occurs. The vehicle travel determining envelope is a buffer with a radius R made on the basis of a maximum vehicle travel envelope required by a standard, where R=150-300 mm.

In addition to the foregoing embodiments, the present invention may further include other implementations. Any technical solution formed through equivalent replacement or equivalent transformation falls within the protection scope claimed in the present invention.

What is claimed is:

1. A vehicle body contour-based derailment detection method for a rail vehicle, comprising the following steps:

step 1: establishing a vehicle body coordinate system and a rail coordinate system in a stationary state, wherein the vehicle body coordinate system takes a projection of a center point of a length between bogie pivot centers on a floor face of a vehicle body as an origin of the vehicle body coordinate system, a length direction of the vehicle body as an X axis of the vehicle body coordinate system, a transverse centerline of the vehicle body as a Y axis of the vehicle body coordinate system, and a vertical centerline of the vehicle body as a Z axis of the vehicle body coordinate system; and the rail coordinate system takes an intersection between a rail cross-section, wherein the origin of the vehicle body coordinate system is located in the rail cross-section, and a rail centerline as an origin of the rail coordinate system, a rail extension direction as an X axis of the rail coordinate system, a transverse connecting line of a rail plane as a Y axis of the rail coordinate system, and a vertical centerline of the rail plane as a Z axis of the rail coordinate system;

step 2: obtaining coordinates of the origin of the vehicle body coordinate system in the rail coordinate system and an included angle between the Z axis of the vehicle body coordinate system and the Z axis of the rail coordinate system from original data of the vehicle body and rails in the stationary state, to determine a relationship between the vehicle body coordinate system and the rail coordinate system;

step 3: measuring distances between measuring points and the rails by using rangefinders mounted on an underframe of the vehicle body, and calculating a transverse displacement of a current vehicle body in the vehicle body coordinate system with reference to the distances between the measuring points and the rails in the stationary state; and measuring an inclination angle of the current vehicle body in the vehicle body coordinate system by using an inclination sensor on the vehicle body;

step 4: obtaining a first dynamic outer contour of the vehicle body in the vehicle body coordinate system with reference to a size of the vehicle body, distribution positions of the measuring points, as well as the transverse displacement of the current vehicle body in the vehicle body coordinate system and the inclination of the vehicle body in the vehicle body coordinate system;

step 5: converting the first dynamic outer contour of the vehicle body in the vehicle body coordinate system into the rail coordinate system with reference to the relationship between the vehicle body coordinate system and the rail coordinate system, to obtain a second dynamic outer contour of the vehicle body in the rail coordinate system; and step 6: dynamically comparing the second dynamic outer contour of the vehicle body in the rail coordinate system with a vehicle travel determining envelope, and detecting an accidental derailment phenomenon in a traveling process of the rail vehicle, wherein the vehicle travel determining envelope is a buffer with a radius R made on a basis of a maximum vehicle travel envelope required by a standard.

2. The vehicle body contour-based derailment detection method for the rail vehicle according to claim 1, wherein the rangefinders are mounted on two sections of the underframe, and each of the two sections is equipped with one rangefinder.

3. The vehicle body contour-based derailment detection method for the rail vehicle according to claim 2, wherein the one rangefinder is located above any rail of the rails.

4. The vehicle body contour-based derailment detection method for the rail vehicle according to claim 3, wherein each of the rangefinders comprises a pair of sensors, and when the rail vehicle is in the stationary state, the pair of sensors sensors are distributed on two sides above a rail of the rails.

5. The vehicle body contour-based derailment detection method for the rail vehicle according to claim 1, wherein if the first dynamic outer contour of the vehicle body in the rail coordinate system exceeds the vehicle travel determining envelope, it is determined that a derailment occurs.

6. The vehicle body contour-based derailment detection method for the rail vehicle according to claim 1, wherein the radius R is 150-300 mm.

7. The vehicle body contour-based derailment detection method for the rail vehicle according to claim 1, wherein in step 3, transverse displacement data of the current vehicle body in the vehicle body coordinate system and inclination data of the current vehicle body in the vehicle body coordinate system are filtered to remove interference data.

8. The vehicle body contour-based derailment detection method for the rail vehicle according to claim 1, wherein each of the rangefinders is a two-dimensional laser sensor.

* * * * *